United States Patent [19]

Mosow

[11] 4,050,616
[45] Sept. 27, 1977

[54] BUMPER-STYLE BICYCLE CARRYING APPARATUS

[76] Inventor: Larry B. Mosow, 5620 Wycliffe Road, Edina, Minn. 55436

[21] Appl. No.: 614,947

[22] Filed: Sept. 19, 1975

[51] Int. Cl.² .............................................. B60R 9/10
[52] U.S. Cl. ................................ 224/42.03 B; 211/17
[58] Field of Search ................. 224/42.03 A, 42.03 B, 224/42.03 R; 211/17, 18, 20, 21, 102, 96; 248/423; 214/450, 42.04

[56] References Cited

U.S. PATENT DOCUMENTS

| 640,736 | 9/1900 | Biester | 211/18 |
|---|---|---|---|
| 1,726,372 | 8/1929 | Stoll | 248/423 |
| 2,803,349 | 8/1957 | Talbot | 224/42.03 B |
| 3,039,634 | 6/1962 | Hobson et al. | 224/42.03 R |

FOREIGN PATENT DOCUMENTS

| 38,139 | 11/1927 | Denmark | 224/42.03 B |
|---|---|---|---|
| 97,617 | 12/1939 | Sweden | 224/42.03 B |

OTHER PUBLICATIONS

Allen Universal Bike Rack, Bike-ette. —Lincoln. Mass. Jan. 1, 1972.

*Primary Examiner*—Albert J. Makay
*Assistant Examiner*—Lawrence E. Williams
*Attorney, Agent, or Firm*—Norman P. Friederichs

[57] ABSTRACT

A telescopically extendable and collapsible bumper-style bicycle carrying rack for motor vehicles. A pair of bumperette housing members disposed in spaced apart relationship are secured to or form a part of the bumper of a motor vehicle. Telescoping support members are members are mounted within the bumperette housing members and are vertically extendable therefrom. A cross brace member is transversely mounted to the tops of the vertically extendable support members for vertical movement therewith. A plurality of bicycle hanger members are adjustably positionable along the length of the cross brace member to enable rapid placement of the hangers for accommodating the size constraints of the particular bicycle to be carried thereby. The vertically telescoping support members may be manually raised and lowered, in which case manually operable latching members lock the telescoping parts in their extended operative position, or can be automatically raised and lowered by means of a motor assembly. The apparatus is aesthetically pleasing and out-of-the-way when disposed in its non-supportive collapsed position such that the vertically telescoping support members are collapsed and encompassed within the bumperette housing members, the cross brace member lies in close proximity with and parallel to the bumper, and the bicycle hanger extensions are folded flat against the cross brace member.

8 Claims, 11 Drawing Figures

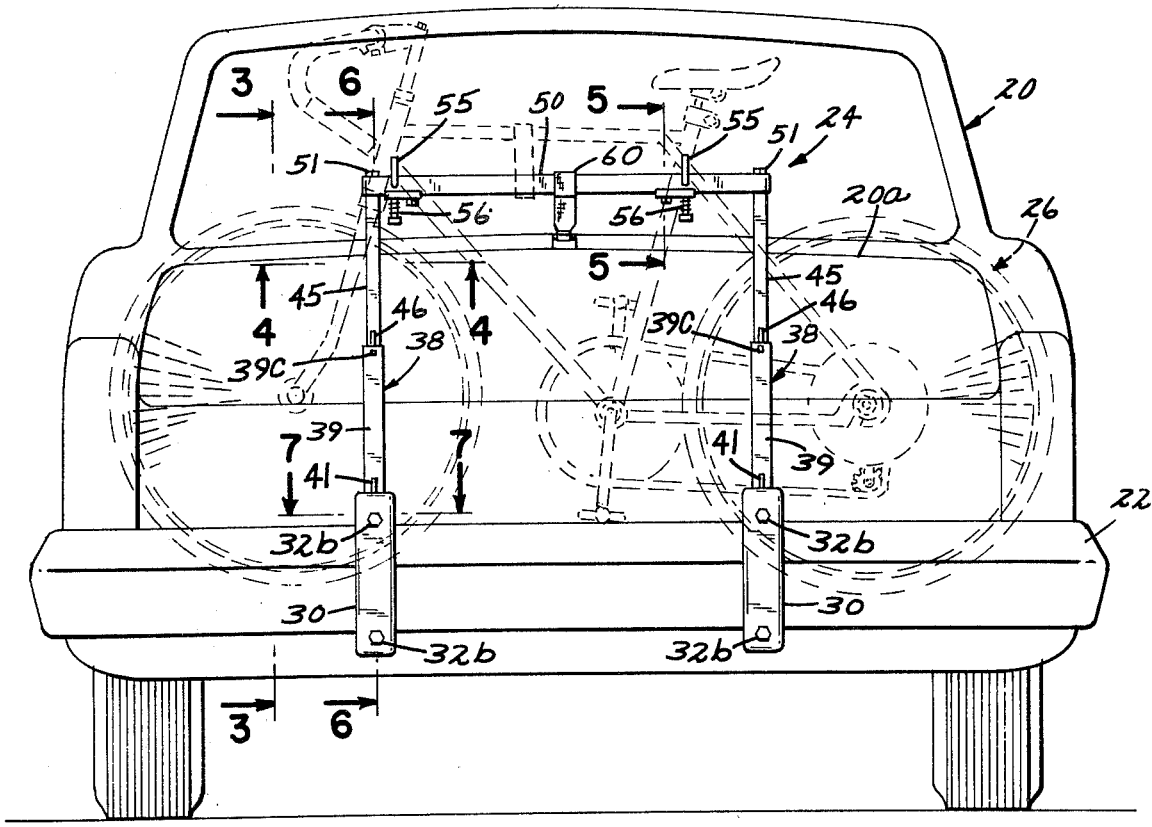
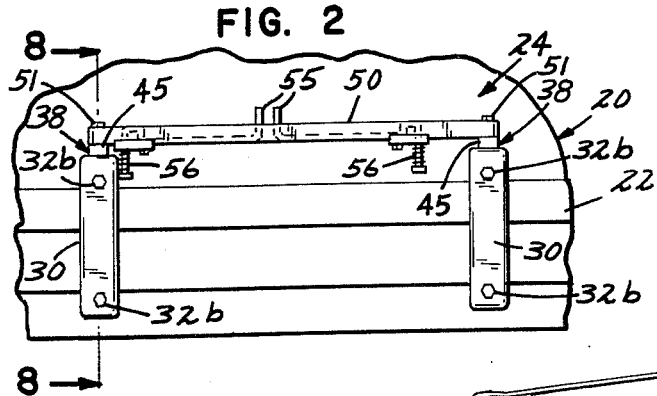
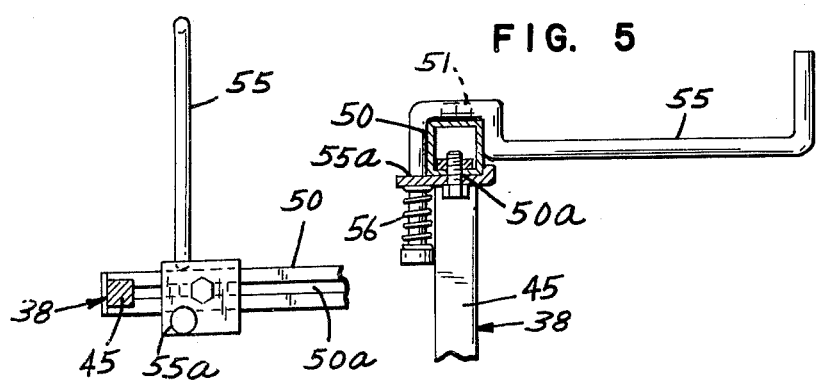
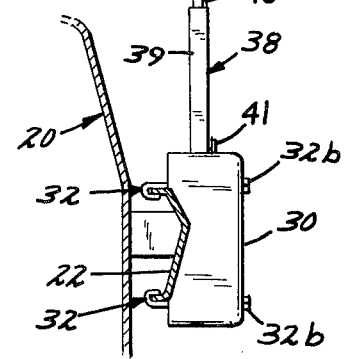

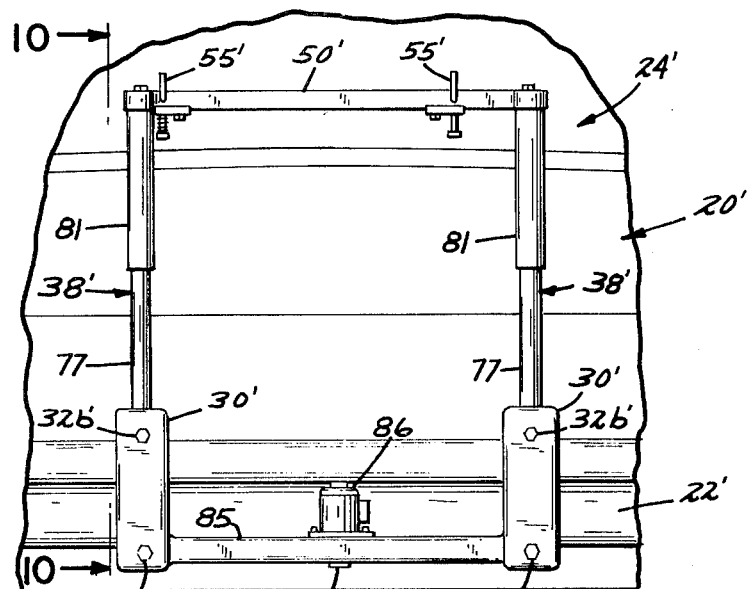
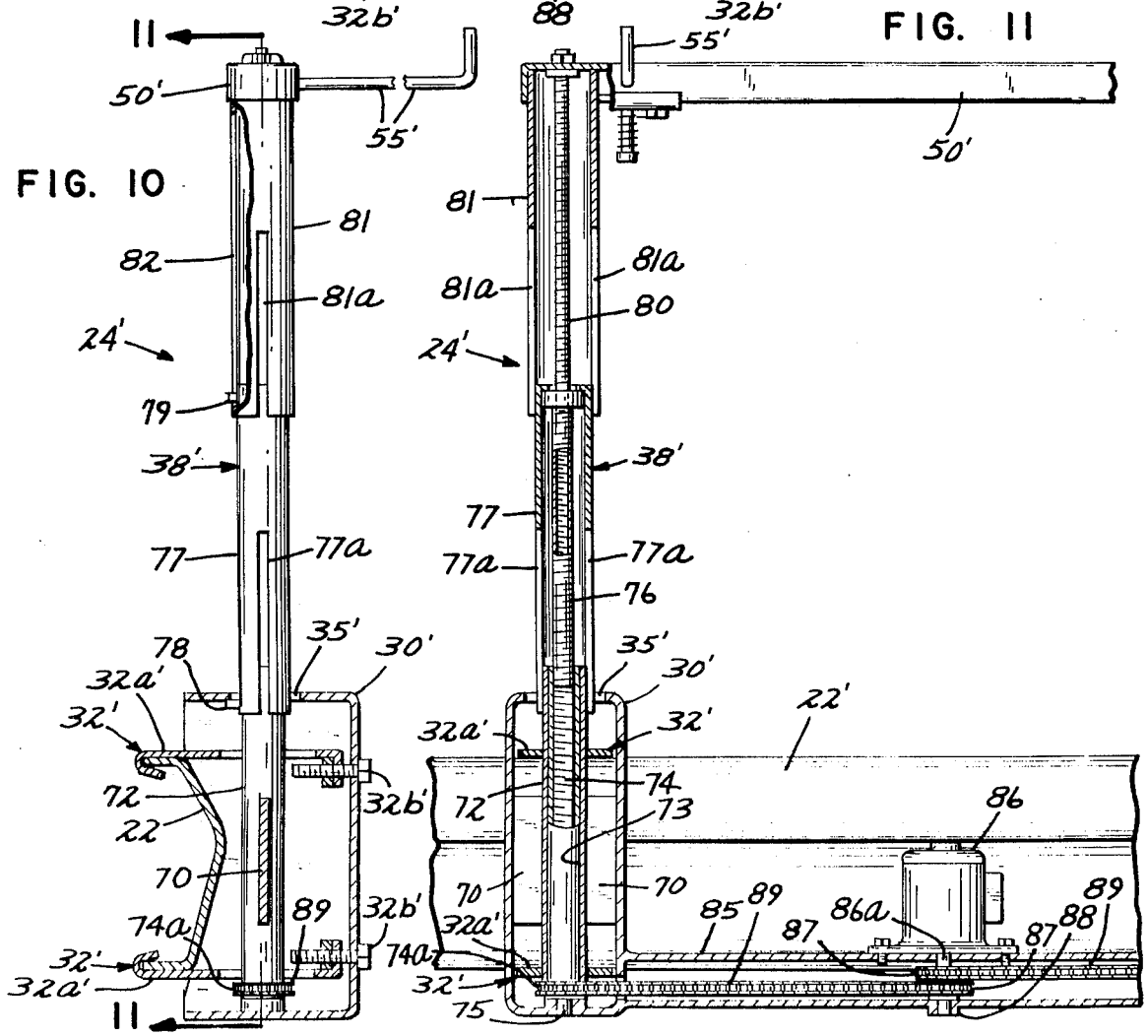

BUMPER-STYLE BICYCLE CARRYING APPARATUS

BACKGROUND OF THE INVENTION

1. Field of the Invention

This invention relates generally to bicycle racks, and more particularly to a collapsible bicycle rack for attachment to or forming a part of a bumper of a motor vehicle.

2. Description of the Prior Art

The recent increased emphasis on bicycling for both sport and pleasure has created a need for cyclists to transport their bicycles over distances requiring the use of a motor vehicle for such transporting purposes. The size of the bicycle and the delicacy of its constituent parts does not generally allow the cyclist to transport his bicycle within his motor vehicle. Therefore, a significant demand has arisen for bicycle carrying racks which can be mounted to the exterior of the motor vehicle for supportingly carrying a bicycle. Such racks must be of sturdy construction for withstanding the environmental elements and for reliably supporting the bicycle carried thereby in the face of winds and turbulence thereof directed against the rack and bicycle carried thereby during the course of movement of the motor vehicle.

Bicycle carrying rack structures suitable for attachment to the exterior of a motor vehicle are known in the prior art. The prior art bicycle carrying racks are generally classified into two types, according to their mounting location upon the motor vehicle. The first type of prior art racks are those which are mountable to the roof of the motor vehicle in car-top carrier fashion and generally support a bicycle in inverted manner on the roof, with the handle bars and seat of the bicycle engaging either the bicycle rack or the roof of the motor vehicle. Such carriers require tie-down straps for securement to the roof and cannot be used with all types of motor vehicles. Further, such racks are generally unsightly when not in use, resulting in an operator typically installing the rack prior to each use thereof with a subsequent removal after use, both operations of which are time consuming and burdensome to the operator. Finally, with such racks it is generally difficult to physically lift the bicycle onto the top of the roof in proper position for securement to the bicycle rack.

The second type of prior art bicycle rack in most common use is that type which mounts to the rear bumper of the motor vehicle, typically referred to as "bumper-type" or "bumper-style" bicycle carrying racks. The bumper-style bicycle carrying rack provides a significant advantage over the car-top mounted type in its applicability to ready loading and unloading of bicycles onto and off of the rack. One such prior art apparatus includes a pair of cylindrical sleeve members clamped or bolted to the bumper in spaced apart relationship, with an inverted U-shaped rigid conduit member mounted within the sleeve. A pair of bicycle hooks are permanently mounted to the U-shaped conduit member for supporting the bicycle thereon.

Another prior art bumper-type bicycle carrying apparatus includes a pair of solid vertical standards rigidly clamped to the bumper with a horizontally extending upper brace member securing the vertical standards to one another in spaced apart relationship. A pair of bicycle hooks are fixedly mounted to the vertical standards for supporting the bicycle. Both of these bumper-style bicycle carrying racks of the prior art are generally unsightly and are burdensome to one attempting to gain access to the motor vehicle trunk compartment when the rack in not in use. Further, these devices are generally not designed for rapid removal, thus requiring an operator to expend significant amounts of time in assemblying and dismantling the bicycle carrying rack prior to and subsequent to use thereof. Such devices are also generally cumbersome and are not easily stored when not in use. Due to the multiplicity of parts involved, and operator must exercise additional caution so as not to lose any one or more of the parts of the assembly during storage and handling thereof.

Other variations of the two basic prior art types of bicycle carrying racks are known in the prior art, but are generally more complex and burdensome than those described above and suffer from the same disadvantages pointed out above.

The present invention overcomes the above-mentioned shortcomings of the bicycle carrying racks of the prior art. The bicycle carrying rack of this invention is of a bumper-style type which is designed for permanent installation on a motor vehicle, thus minimizing operator assembly and disassembly thereof and eliminating storage problems and worry over loss of parts. By the use of telescoping parts, the rack can be rapidly collapsed in low-profile configuration relative to the bumper in a manner which is both aesthetically pleasing and allows free access to the trunk area and gasoline tank inlet port of the motor vehicle.

SUMMARY OF THE INVENTION

The present invention is a bumper-style bicycle carrying rack which can be formed as an integral part of the bumper of a motor vehicle or as an attachment to an existing motor vehicle bumper. A pair of bumperette housing members are designed for securement in spaced apart relationship to the bumper, preferably the rear bumper, of a motor vehicle. Each of the bumperette housings defines an internal cavity sized to encompassingly accept a vertically telescoping support member. A cross brace member is horizontally disposed between and connected to the top ends of the vertically telescoping support members and moves vertically upward and downward therewith. A pair of bicycle hanger members are adjustably mounted to the cross brace member and are longitudinally positionable therealong for supporting alignment corresponding to the particular size and configuration of the bicycle to be carried thereby. The bicycle hook members also are pivotable to fold flat-against the cross brace member when not in use.

In one embodiment of the invention, the vertically telescoping members are manually raised and lowered. Locking means are provided on the vertically telescoping members to secure the members in their extended operative positions. These locking members are rapidly manually releasable for lowering the telescoping members into their respective cavities within the bumperette housing members when not in use. In the second embodiment of the invention, the vertically telescoping members are automatically raised and lowered by means of a small electric motor.

While the present invention will be described with respect to preferred configurations for the telescoping vertical support members, it will be understood that the principles of this invention are broad enough to cover any telescoping bicycle rack configurations which are collapsible to be substantially enclosed within housing portions connected to or forming a part of the bumper of a motor vehicle. Also, while a specific motorized technique will be illustrated for automatically raising and lowering the bicycle rack apparatus, it will be understood that other automatic raising and lowering apparatus are envisioned within the broad scope and intent of this invention.

BRIEF DESCRIPTION OF THE DRAWING

Referring to the Drawing, wherein like numerals represent like parts throughout the several views:

FIG. 1 is a front elevation view of one embodiment of the bicycle carrying apparatus of this invention, illustrated as attached to the rear bumper of a motor vehicle, in its operatively extended position and showing a bicycle carried thereby in dashed lines;

FIG. 2 is a fragmentary front elevation view of the bicycle carrying apparatus disclosed in FIG. 1, illustrated in its collapsed position;

FIG. 3 is a side elevation view of the bicycle carrying apparatus disclosed in FIG. 1, generally as viewed along the line 3—3 of FIG. 1;

FIG. 4 is a bottom sectional view of a portion of the bicycle carrying apparatus of FIG. 1, generally viewed along the line 4—4 of FIG. 1;

FIG. 5 is an enlarged sectional view of the upper cross-section bar member portion as seen from the line 5—5 of FIG. 1, illustrating the detailed connection of a bicycle hanger member;

FIG. 9 is a fragmentary front elevation view of a second embodiment of the bicycle carrying apparatus of this invention, disclosing motorized raising and lowering apparatus therefor;

FIG. 10 is an enlarged side elevation view with parts thereof broken away of the bicycle carrying apparatus disclosed in FIG. 9, generally viewed along the line 10—10 of FIG. 9; and FIG. 11 is a vertical cross-sectional view with parts thereof broken away of a portion of the bicycle carrying apparatus disclosed in FIG. 10, generally viewed along the line 11—11 of FIG. 10.

DESCRIPTION OF THE PREFERRED EMBODIMENT

Figure 6:
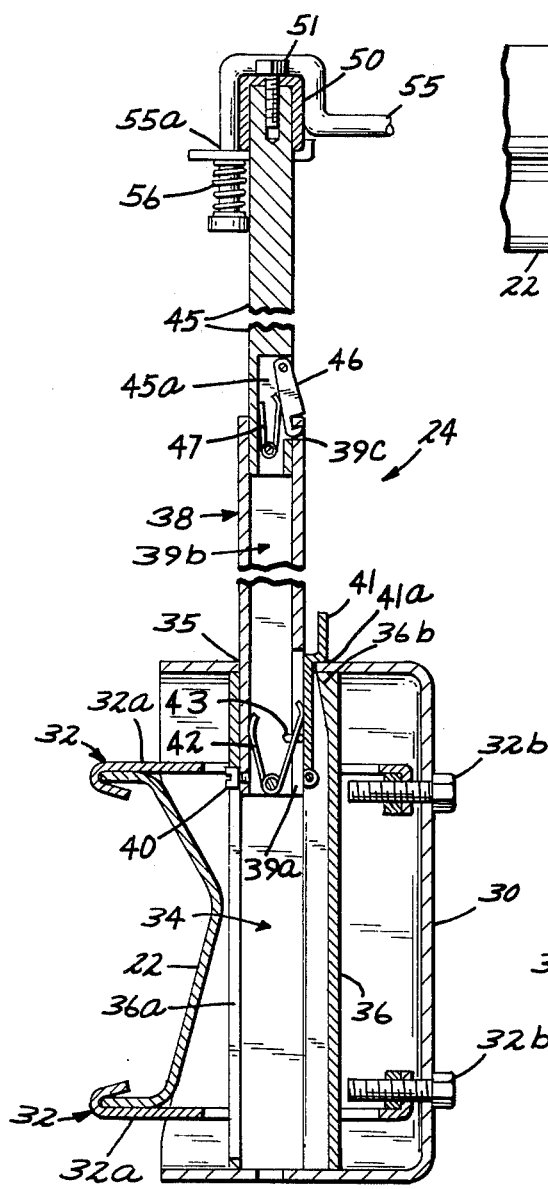
FIG. 6 is an enlarged cross-sectional view with parts thereof broken away of the bicycle carrying apparatus disclosed in FIG. 1, generally taken along the line 6—6 of FIG. 1.

Referring to the Figures, there is generally disclosed in FIGS. 1 through 8 a preferred embodiment of a manually operable bicycle carrying apparatus of this invention. Referring to FIG. 1, there is generally disclosed an automobile 20 having a rear bumper 22 to which is mounted the bicycle carrying rack of this invention, generally indicated at 24. A bicycle 26 is illustrated as it would typically appear when operatively carried by the bicycle carrying rack 24.

The preferred embodiment of the bicycle carrying rack 24 will be disclosed as it would appear as an attachment to the bumper 22 of the automobile 20; however, it will be understood that the bumper 22 could equally well be designed to include the bicycle carrying rack 24 as an integral part thereof, in which case no attachment or clamping means for the bicycle carrying rack apparatus 24 to the bumper 22 would be required.

A pair of bumperette housing members 30 are secured to the bumper 22 in spaced apart relationship relative to one another. The bumperette members 30 are secured to the bumper 22 by means of clamp assemblies 32 having an elongate flat clamp portion 32a for engaging the upper and lower edges of the bumper 22, and anchor bolts 32b for securing the bumperette member 30 in tight engagement against the face of the bumper 22. The bumperette members are of generally rectangular configuration each having an open end addressing the bumper 22.

The bumperette housing members 30 are configured to provide an aesthetically pleasing appearance when secured to the bumper. The outer casing of the housing members 30 is generally U-shaped when viewed from above (see FIG. 7), with those edges of the housing which engage the bumper 22 being shaped to matingly conform to the contour of the bumper (see FIGS. 3, 6 and 8). For the attachment version illustrated, the anchor bolts 32b of the clamp assemblies 32 project from the front surface of the bumperette housing members 30; however, the bumperette housing members could equally well be permanently affixed to the bumper 22 by means of welding or the like. Since the right and left half portions of the bicycle carrying rack 24 are symmetrical with respect to one another and since all parts thereof are identical in construction and operations to one another, the following description will be made with respect to only one half each of the elements disclosed. It will be understood that like elements, operating in identical manner are present for the non-described half of the bicycle carrying rack and carry like numerals.

Figure 7:
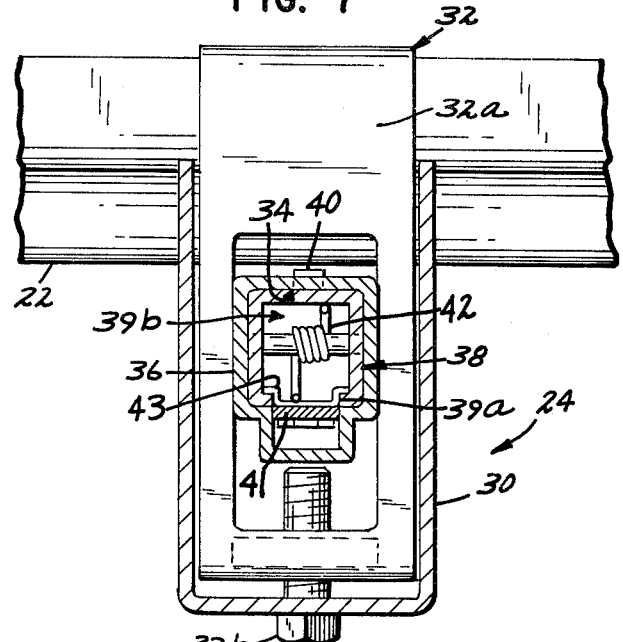
FIG. 7 is an enlarged horizontal sectional view of a housing member portion of the bicycle carrying apparatus disclosed in FIG. 1, generally taken along the line 7—7 of FIG. 1.
Figure 8:
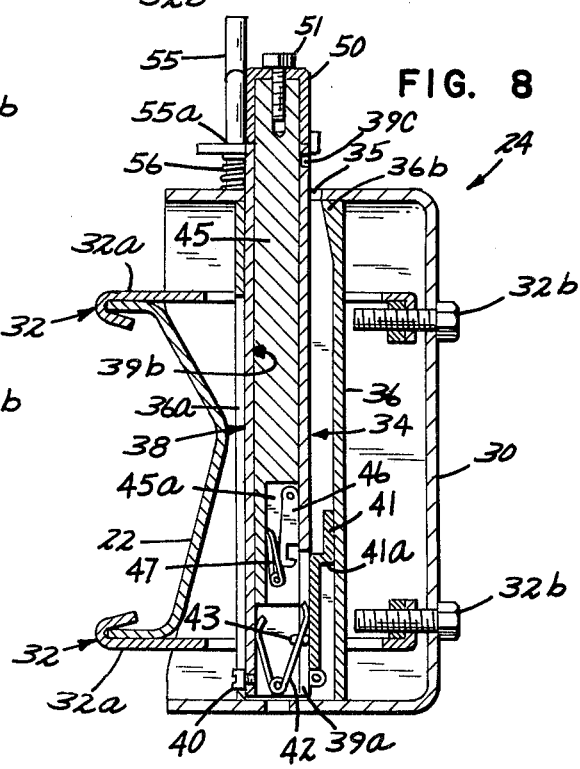
FIG. 8 is an enlarged vertical sectional view of the bicycle carrying apparatus disclosed in FIG. 2, generally taken along the line 8—8 of FIG. 2.

Referring to FIGS. 6-8, a vertically extending sleeve member 36 extends between the upper and lower surfaces of the housing member 30 and defines an internal cavity 34 for accepting a vertically extending support member, hereinafter described, and having an inlet port 35 through the upper surface of the bumperette housing member 30 opening into the internal cavity 34 of the sleeve member 36. That surface of the sleeve member 36 lying adjacent the bumper 22 has a vertically extending slot 36a (see FIG. 6) therein. The upper front surface of the sleeve member 36 has a ramp shaped cam surface portion at 36b extending from the inner surface of the front wall of the sleeve member 36 to the front edge of the inlet port 35 (see FIGS. 6 and 8).

A vertically telescoping support member generally designated at 38 is slidably retainably mounted within the sleeve member 36. The telescoping support member 38 has a lower elongate box-like standard 39 sized to slidably engage the inner walls of the sleeve member 36. A retaining nut 40 is threaded into the lower standard 39 near its bottom edge and projects into the guide slot 36a of the sleeve member 36. The upper surface of the guide slot 36a in combination with the retaining nut 40 define the maximum upward travel of the lower standard 39 with respect to the sleeve member 36, see FIG. 6.

A hinge locking member 41 is pivotally mounted to the lower standard member 39 for movement therewith. The locking member 41 has a flanged portion 41a disposed to retainably engage the upper wall portion of the bumperette housing 30 when the lower standard support 39 is in its maximum extended vertical position as illustrated in FIG. 6. A spring member 42 mounted within the lower standard support 39 biases the locking member 41 for clockwise rotation (as viewed in FIG. 6) about its pivot point, to maintain the lower standard member 39 in its maximum vertically extending position. A retaining member 43 connects the spring member 42 to the locking member 41 to prevent the locking member 41 from being pulled out from the lower standard 39 when the standard is removed from the retaining sleeve member 36. The front lower surface of the lower support member 39 is notched at 39a to accept the hinged locking member 41, against the bias of the spring 42 when the lower standard support 39 is lowered in collapsed position within the sleeve member 36.

The lower support standard 39 defines an internal cavity 39b sized to slidably accept an upper generally rectangular support standard 45. In the preferred embodiment, the upper support standard 45 is a solid piece of material, notched out at 45a to accept a second retaining lock member 46 pivotally mounted to the upper standard 45, and a spring member 47 normally biasing the retaining lock member 46 for counterclockwise rotation (as viewed in FIG. 6) about its pivot point. The upper forward wall of the lower support standard 39 is notched at 39c to lockingly accept the second retaining lock member 46 when the upper support standard 45 is vertically positioned in its maximally extended position as illustrated in FIG. 6. The second retaining lock member 46 is pivotal in the clockwise direction (as viewed in FIG. 6) against the bias of the spring member 47 to release the upper support standard 45 from locking engagement with the lower support standard 39 such that the upper support standard 45 can be telescopically received within the internal cavity 39b of the lower support standard 39, as illustrated in FIG. 8.

FIG. 6 illustrates the vertically telescoping support member 38 in its operatively supportive maximally vertically extended position with the first and second retaining lock members 41 and 46 respectively in their locked positions. FIG. 8 illustrates the vertically telescoping support member 38 in its non-supportive, collapsed position with the upper support standard 45 lowered within the internal cavity 39a of the lower support standard 39, with the lower support standard 39 encompassed within the internal cavity 34 of the sleeve guide member 36, and with the first and second retaining lock members 41 and 46 respectively illustrated in their released positions.

A cross brace bar 50 laterally extends between the pair of upper support standards 45 and is bolted thereto by a pair of bolts 51 for vertical movement with the upper support standard 45. When the vertically telescoping support member 38 is positioned in its non-supportive collapsed position, as illustrated in FIG. 2, the cross brace bar 50 is vertically positioned to lie on or just above the upper surface portions of the bumperette housing members 30. In such position, the cross brace bar 50 does not interfere with access to the trunk portion of the motor vehicle or to the gasoline-fill spout of those motor vehicles which have such fill spouts behind the license plate of the motor vehicle. The cross brace bar 50 has an elongate groove 50a formed in the lower surface thereof (see FIG. 4), longitudinally extending the length of the cross brace bar 50 between the upper support standard 45.

A pair of bicycle hanger members 55 are bolted to the cross brace bar 50 through the elongate groove 50a in its lower surface. This attachment configuration of the bicycle hanger members 55 enables the hanger members to be rapidly longitudinally positioned along the length of the cross brace bar 50 for adapting their relative positions to conform to the specific size and configuration of the bicycle to be carried thereby. The hanger mounting portion of each of the bicycle hanger members 55 is pivotally mounted at 55a (see FIGS. 2, 4 and 5) to the supporting mounting bracket therefore, against the bias of a spring 56. The pivotal mounting enables the extended hanger portions of the hanger members 55 to be vertically lifted against the bias of the spring 56 for positioning between an operative extended position, as illustrated in FIG. 5, and a folded collapsed position in cooperative engagement with the cross brace bar member 50, as illustrated in FIGS. 2 and 8. Thus, when the bumper rack 24 is not in operative use, the bicycle hanger members 55 are collapsed in out-of-the-way position, as well as the vertically telescoping support members 38, as illustrated in FIG. 2.

A brace strap 60 is adjustably clamped between the cross brace bar 50 and the forwardly disposed edge 20a (see FIG. 3) of the trunk enclosing door member of the motor vehicle 20 to provide horizontal bracing support of the vertically telescoping support members 38 against wind pressures and turbulence thereof against the rack assembly 24 and the bicycle 26 held thereby when the motor vehicle is moving.

FIG. 1 illustrates the typical manner in which a bicycle 26 would be carried by the rack assembly 24 when the vertically telescoping support members 38 are operatively positioned in their extended supporting condition.

A second embodiment of the bicycle-carrying apparatus of this invention, including motorized means for automatically raising and lowering the vertically telescoping support members of the bicycle rack is illustrated at 24' in FIGS. 9, 10 and 11. Referring thereto, those parts of the second embodiment which represent similar parts previously described with respect to the first embodiment of the invention, will be identified by reference numerals of like number to those used with respect to the first embodiment, followed by a prime (') designation.

A pair of bumperette housing members 30' are secured to the bumper 22 in spaced apart relationship to one another by means of a clamping assembly 32'. A pair of webb members 70 are secured to the oppositely disposed side walls of the bumperette housing 30' and extend inwardly therefrom to vertically support a cylindrical sleeve member 72. The upper portion of the sleeve member 72 vertically extends through an inlet port 35' and forms an internal cavity 73 in the bumperette housing member 30'. A vertically telescoping support member 38' is mounted to cooperatively engage and extend from the sleeve member 72.

The telescoping support member 38' includes a first internally threaded cylindrical member 74 coaxially aligned with the sleeve member 72 and mounted for free sliding engagement therewith by means of a vertical axel 75 mounted to the bottom wall of the bumperette housing 30'. The lower portion of the first cylindrical member 74 is connected to a sprocket 74a positioned below the lower surface of the sleeve member 72 for rotating the first cylindrical member 74 within the sleeve member 72. The internal wall of the first cylindrical support member 74 is threaded to accept a second cylindrical support member 76 which is externally threaded to mate with the internal threading of the first cylindrical support member 74.

The second cylindrical support member 76 is also internally threaded to accept a third cylindrical support member 80, comprising in the preferred embodiment, a solid externally threaded shaft member. A cylindrical outer tube casing member 77 is connected for vertical movement with the second cylindrical support member 76 but does not rotate therewith, as hereinafter described. The cylindrical casing member 77 has a pair of elongate slots 77a longitudinally extending through the casing member on diametrically opposite sides thereof to enable the casing member 77 to freely slide over the pair of webb members 70 when the casing member 77 is lowered to its collapsed position. A stop member 78 is secured to the outer casing member 77 near its bottom end (FIG. 10) and engages the upper wall of the bumperette casing member 30' near the inlet port 35' thereof to define the maximum upward travel of the cylindrical casing member 77 and its underlying second cylindrical support member 76. The casing member 77 also has a key member 79 mounted near its upper end for movement therewith.

An upper cylindrical casing member 81 overlies the third cylindrical support member 80 and is vertically movable therewith. A cross brace bar member 50' is secured to the pair of upper casing members 81 by means of a nut lockingly threaded to the top end of the third cylindrical support member 80, preventing the third cylindrical support 80 from rotating and also preventing the upper casing member 81 from rotating. The upper casing member 81 has a pair of elongate slots 81a extending from the lower edge of the upper casing member 81 and through the walls thereof at diametrically opposite sides thereof. The slots 81a are designed to accommodate the pairs of webb members 70 for enabling the upper casing member 81 to freely collapse into the bumperette housing 30' when in a collapsed mode of operation. The casing member 81 also has an elongate keyway slot 82 longitudinally extending through one wall portion thereof. The key member 79 cooperatively engages the keyway slot 82 in the casing member 81 to prevent the lower casing member 77 from rotating about its longitudinal axis during raising and lowering operations of the vertically telescoping support member 38'.

The upper casing member 81 has an inner diameter sized to cooperatively slidably engage the outer surface of the casing member 77. The inner diameter of the casing member 77, likewise is sized to cooperatively slidably engage the outer surface of the sleeve member 72. Therefore, the upper casing member 81, the lower casing member 77 and the sleeve member 72 cooperatively slidably engage with one another in telescoping fashion to extend to a maximally raised position as illustrated in FIGS. 9 through 11, and to collapsibly retract upon one another for substantial encompassment by the bumperette housing member 30' in that manner as illustrated with respect to the first embodiment of the invention in FIG. 2.

The cross brace bar 50' has adjustably mounted thereto a plurality of bicycle hanger members 55' of construction identical to that previously disclosed with respect to the first embodiment of the invention.

The pair of bumperette housing members 30' are connected to one another by means of a channel iron cross brace member 85, maintaining the bumperette housing members 30' in fixed spaced relationship to one another.

An electric motor 86, powered by an appropriate power source (not illustrated) and activated by an appropriate switching mechanism (not illustrated) is mounted to the brace member 85. The motor has an output shaft 86a to which are connected a pair of drive sprockets 87. The output shaft 86a of the motor 86 is journaled with a bearing 88 mounted to the channel iron brace member 85. A pair of drive chains 89 connect the idler sprockets 74a for driving rotation by the respective drive sprockets 87.

The first, second and third cylindrical support members 74, 76 and 80 respectively are threaded in proper manner relative to one another so as to cooperatively raise and lower the vertically telescoping support member 38' in response to the direction of rotation of the output shaft 86a of the motor 86. Referring to FIG. 11, when the motor 86 is operated so as to raise the telescoping support members 38', the idler sprocket 74a will be driven to rotate the first cylindrical support member 74 so as to unthread the second cylindrical support member 76 therefrom, thus raising the outer casing member 77. When the second cylindrical support member 76 has been unthreaded to a position such that the stop member 78 prevents further vertical motion of the casing 77, the second cylindrical support member 76 will thereafter rotate about its longitudinal axis with the first cylindrical support member 74 to effect an unthreading of the third cylindrical support member 80 from the second cylindrical support member 76. Unthreading of the third cylindrical support member 80 will effect a raising of the upper casing member 81 by arrestingly engaging the key member 79.

When the vertically telescoping support members 38' are to be lowered, the motor 86 is energized to reverse the direction of rotation of its output shaft 86a, thus effecting a lowering of the telescoping support members 38' by rethreading the first, second and third cylindrical support members 74, 76 and 80 respectively onto one another in a manner inversely of that just described with respect to raising of the telescoping support members 38'.

It will be understood that while the casing members 77 and 81 have been disclosed as cylindrical members, casing members having rectangular cross-sectional configurations or other geometrical configurations could equally well be used. Further, while a specific telescoping configuration has been illustrated for the purposes of describing the broad concepts of a motorized automatic raising and lowering configuration of the invention, it will be understood that many other configurations could be devised by those skilled in the art to effect comparable automated apparatus which could fall within the spirit and intent of this invention. It will also be understood that the motor/drive chain combination may equally well be replaced by many alternative means for raising and lowering the telescoping support standards. For example only, hydraulic means could be used as well as those well-known mechanisms used for raising and lowering automobile antennas.

While I have disclosed specific embodiment of my invention, it is to be understood that these embodiments were described with the intent to provide concrete examples of specific embodiments clearly disclosing the present invention. It is to be understood that these disclosures are for the purpose of illustration only and that all alternatives, modifications and variations of the present invention are covered by this patent, which is to be limited only by the broad scope of the appended claims.

What is claimed is:

1. A collapsible bicycle carrying rack for attachment to a bumper of a motor vehicle, comprising:
   a. a pair of low-relief bumperette housing members suitable for attachment to a bumper of a motor vehicle, each of said housing members defining an internal cavity, said housing members having a length approximating that of the vertical dimension of a bumper, said housing members being substantially U-shaped in horizontal cross-section and having an open face for addressing the bumper, said open face being defined by edges which engage said bumper;
   b. means for mounting said housing members to a bumper of a motor vehicle, in spaced apart relationship relative to one another; and
   c. vertically telescoping support means mounted to said housing members for supportingly carrying a bicycle in elevated position above the bumper, said support means including a pair of vertical support standards positionable in an extended position telescopically projecting from said housing members, and positionable in a collapsed position for substantial encompassment within said cavities of said housing members, each of said vertical support standards cooperating with the respective housing member to provide vertically telescoping support means comprising at least three telescoping members.

2. A collapsible bicycle carrying rack as recited in claim 1, wherein said support means further includes latching means cooperatively connecting adjacent ones of said plurality of support member segments for selectively locking said adjacent support member segments in their operatively extended positions, said latching means being releasible to unlock said adjacent support member segments, enabling telescoping collapsible movement of said adjacent segments relative one another.

3. A collapsible bicycle carrying rack as recited in claim 2, wherein said support means further includes:
   a. a cross brace member secured to the top of the uppermost ones of said plurality of support member segments and vertically movable therewith; and
   b. a plurality of bicycle hanger means connected to said cross brace member and projecting in extended manner therefrom for supportingly engaging a bicycle.

4. A collapsible bicycle carrying rack as recited in claim 3, wherein each of said bicycle hanger means comprises:
   a. a base mounting member adjustably securable to said cross brace member longitudinally along the length thereof; and
   b. an elongate hook member mounted to said base mounting member, transversely projecting outwardly from said cross brace member.

5. A collapsible bicycle carrying rack as recited in claim 4, wherein each of said bicycle hanger means further includes positioning means operatively connecting said hook member to said base mounting member for selectively pivotally positioning the longitudinal direction of said hook member relative to the cross brace member, said positioning means being operable in a first position to direct the hook member in extended manner transversely of the cross brace member, and being operable in a second position to place said hook member in collapsed manner in close proximity with and parallel to the longitudinal length of said cross brace member.

6. A collapsible bicycle carrying rack as recited in claim 1, further including drive means operatively connected to said telescoping support means for automatically raising and lowering said vertical support standards respectively between their said extended and collapsed positions.

7. A collapsible bicycle carrying rack as recited in claim 6, wherein said drive means includes an electric motor, and means connecting the output drive of said motor with said telescoping support means for raising and lowering said vertical support standards thereof.

8. A bumper-style bicycle carrier rack as recited in claim 1, wherein said open face is defined by edges which are adapted to engage a bumper, said edges matingly conforming to the shape of said bumper.

* * * * *